Jan. 10, 1950 C. A. MENELEY 2,493,921
PHASING APPARATUS
Filed Oct. 31, 1944 3 Sheets-Sheet 2
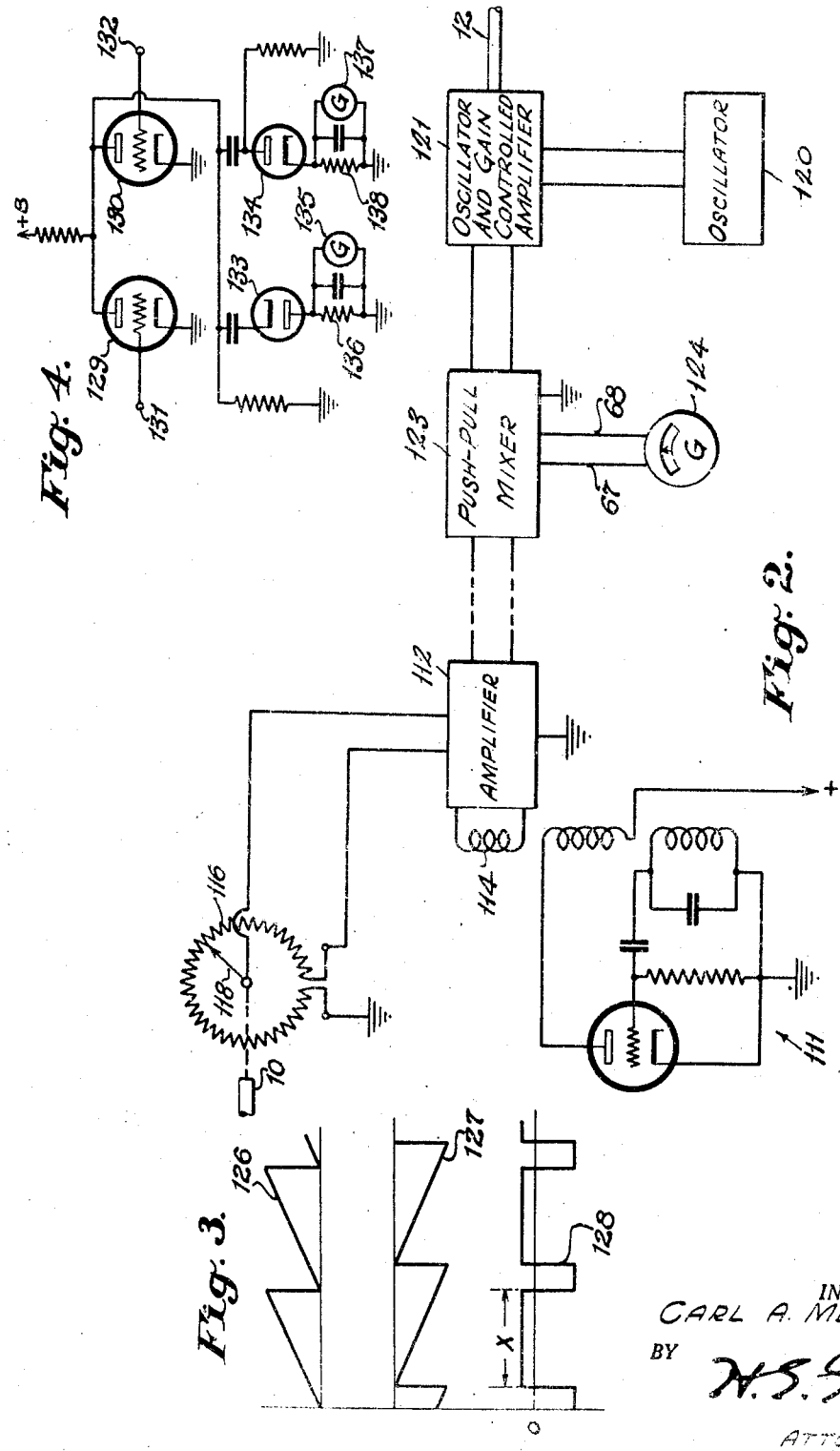
INVENTOR.
CARL A. MENELEY
BY
H. S. Snover.
ATTORNEY Jan. 10, 1950     C. A. MENELEY     2,493,921
PHASING APPARATUS
Filed Oct. 31, 1944     3 Sheets-Sheet 3
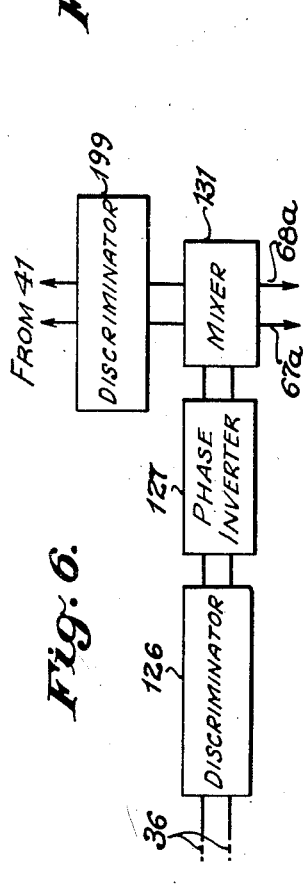
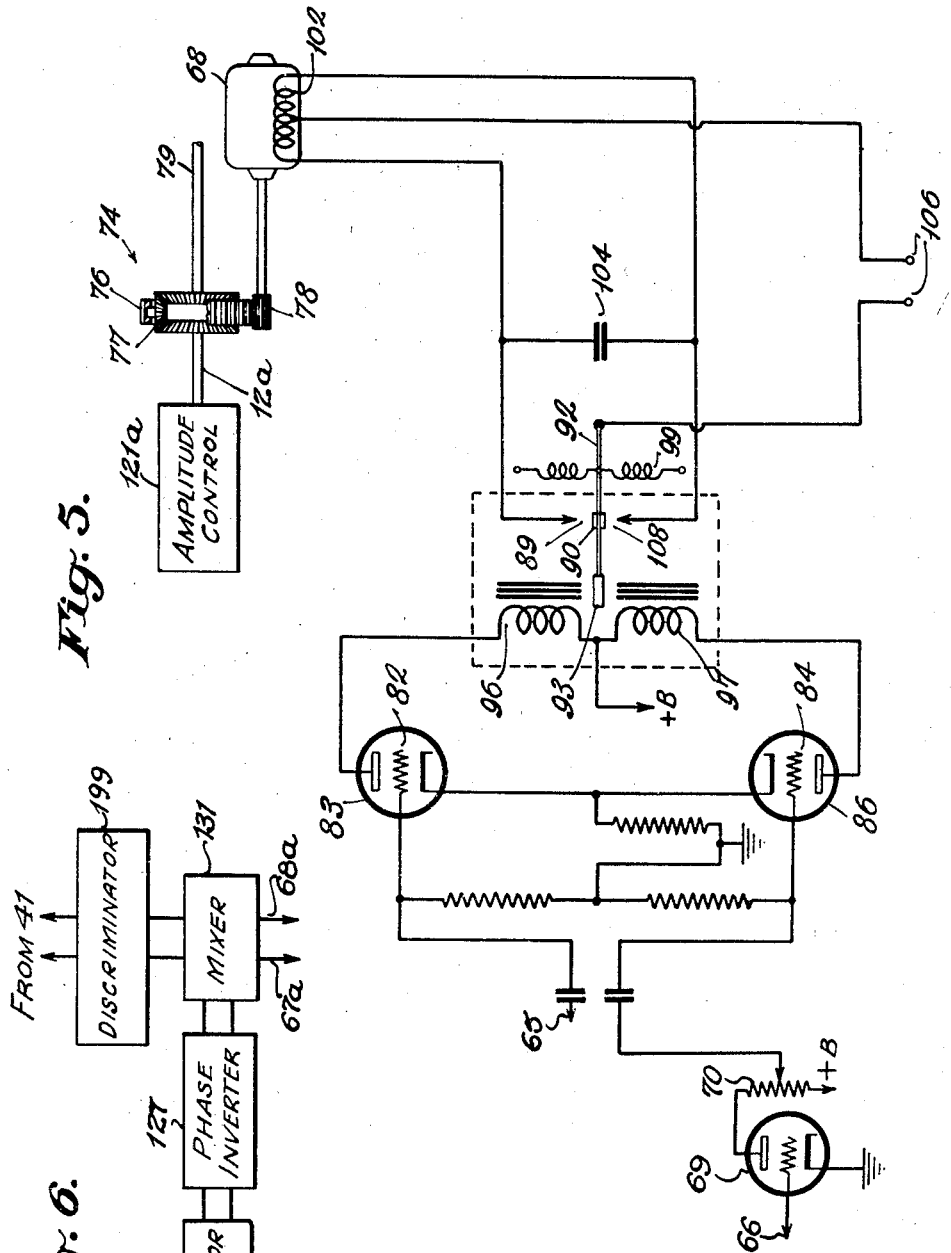
INVENTOR.
CARL A. MENELEY
BY
*H. S. Grover*
ATTORNEY Patented Jan. 10, 1950

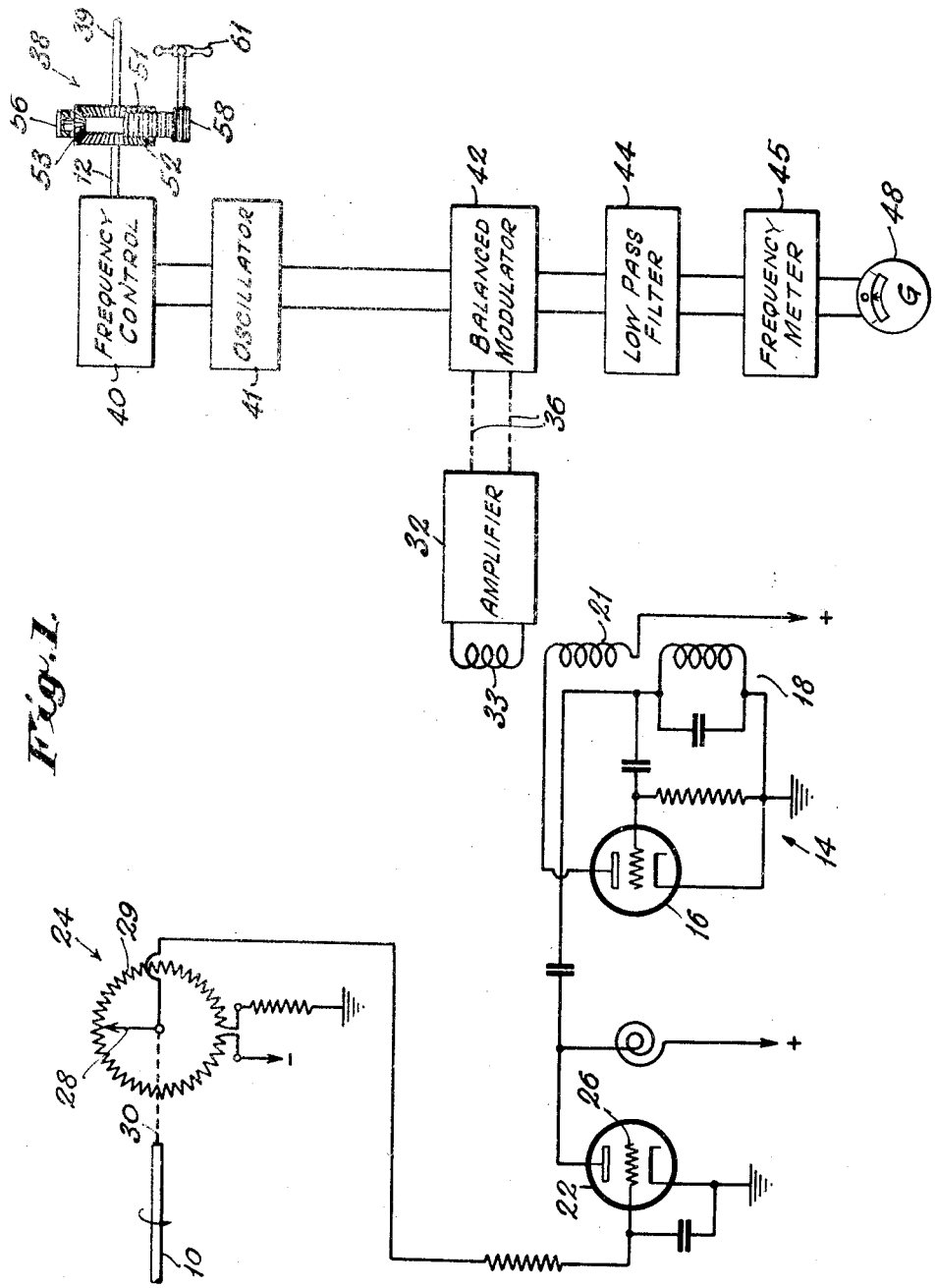

2,493,921

UNITED STATES PATENT OFFICE 2,493,921

PHASING APPARATUS

Carl A. Meneley, Princeton, N. J., assignor to Radio Corporation of America, a corporation of Delaware Application October 31, 1944, Serial No. 561,284

3 Claims. (Cl. 318—437)

The present invention relates generally to systems for indicating and/or controlling the phase or instantaneous angular relationship of two or more movable members, and more particularly to novel systems and apparatus for comparing the phase or angular relationship of two or more moving or rotating systems or members, such, for example, as a pair of shafts closely or remotely situated with respect to each other. The invention is applicable to the phasing of facsimile apparatus and to the phasing of component color separation discs or drums or the like used in color television systems, or for allied fields of use such as in connection with film transmission by television.

In fields of activity such as those just noted by way of example, it is necessary to operate interconnected equipment not only at the same speed but cophasally. Accordingly, one of the objects of the invention is to provide a novel system and apparatus to be used in a system for accurately synchronizing, as to phase, and hence as to speed, the movement of a plurality of moving devices.

Another object is to provide novel apparatus which will produce a plurality of electrical waves for comparison, a characteristic of each wave being varied continuously in a predetermined manner to facilitate such comparison.

A further object is to modulate a wave, having a characteristic which is continuously varying, by another wave, having a characteristic varying in a like manner, the modulation product being available to produce an indication of the phase difference of two movable systems or members.

A still further object is to modulate a wave, having a characteristic which is continuously varying, by another wave having a characteristic varying in a like manner, the modulation product being employed to provide automatic control of the phase relationship between a plurality of movable systems.

In the illustrative examples, a system of automatic phase indication is provided by which a continuous indication of the phase difference of two rotating systems at different stations may be obtained. Also, means are shown, illustratively, for manually varying the cophasal relationship of the two rotating systems. Another portion of the disclosure herein shows, by way of example, an arrangement for automatically maintaining a desired cophasal relationship. In the illustrative embodiments herein, a wave is produced at each station whose amplitude or frequency is modulated in saw tooth fashion in accordance with the position of the local rotating system. One of these waves is transmitted continuously to the other station which, for convenience of exposition, may be termed the receiving station. At the receiving station the amplitudes, or frequencies, of the two waves are compared, and from the difference in amplitude or frequency, an indication of the phase difference of the two rotating systems is obtained. The algebraic sign of the amplitude difference shows which rotating system is ahead in phase.

Other important objects of the present invention will be perceived upon a reading of the following specification, taken together with the drawing, in which:

Fig. 1 is a schematic representation of a system embodying the invention:

Fig. 2 is a schematic representation of a modified system embodying the invention;

Fig. 3 shows a series of related curves used in explaining the operation of the apparatus of Fig. 2;

Fig. 4 shows a modification of the arrangement of Fig. 2;

Fig. 5 shows a modification of Fig. 2 in which automatic operation is obtained; and Fig. 6 shows additional equipment to be used with the apparatus of Fig. 1 when the automatic system of Fig. 2 is employed.

Referring for the present to Fig. 1, a system is shown, by way of example, in which a movable member, such as a rotating shaft 10 at one station, which may be considered the transmitting station, is to be maintained in phase with the rotation of a shaft 12 at another station, which may be considered the receiving station. It will be understood that while the members 10 and 12 are to be referred to as shafts for the purpose of convenience in explaining the invention, these members may be movable members of any kind, performing any cycle of movement necessary to the operation of the associated machine such as a facsimile machine, a color television apparatus, or the like.

An oscillator indicated in its entirety by reference character 14 is set to operate at any desired normal frequency, for example, 3,000 C. P. S. The oscillator may be of any type or kind desired. The oscillator comprises a vacuum tube 16 and a tank circuit 18 which is coupled in the customary manner to the plate circuit by a transformer 21. The frequency of the oscillator 14 is to be varied in the normal course of operation of the equipment which includes the shaft 10 by a frequency control means shown as a reactance tube 22 receiving its bias from a potentiometer 24. The function and operation of a frequency control or phase control tube in conjunction with an oscillator is by now well known to those skilled in the art, and therefore, a detailed description of the operation of the tube 22 will not be given. Typical arrangements are shown on page 363 of "Theory and Applications of Electron Tubes" by Herbert J. Reich. Other arrangements of a suitable nature are also referred to in this citation and in Patent No. 2,121,103, granted to S. W. Seeley, June 21, 1938, and it will be understood that the showing of Fig. 1 herein is thus given illustratively.

The potentiometer 24 serves to apply a variable negative bias to a control electrode 26 of the reactance tube 22 as the shaft 10 rotates, and to this end, the movable contact 28 of the potentiometer is arranged to travel over the resistance element 29 synchronously with the rotation of the shaft 10. Any suitable means for interconnecting the shaft 10 and the movable contact 28 may be employed, this means being represented by the dotted line 30. The operating characteristic of the potentiometer 24 is preferably so chosen that the oscillator frequency is varied in saw-tooth fashion. For each revolution of the shaft 10, the voltage on the control electrode 26 of the reactance tube 22 is varied linearly from a maximum to a minimum value, causing the output of the oscillator 14 to vary from its maximum to its minimum frequency. The frequency of the oscillator 14 then indicates the position of the shaft 10, since for each position of this shaft, the reactance tube 22 will have a single value of bias, and the oscillator 14 will thus have a single value of frequency. Solely by way of example, the oscillator frequency may be varied from 3,500 to 2,500 cycles for each revolution of the shaft 10.

The oscillator output is applied to the input of an amplifier 32 from a coupling coil 33 which is coupled to the plate coil and tank circuit inductance of the oscillator 14. It will be understood that the coils 18, 21, and 33 may be windings of a common transformer or that other means may be employed to obtain an output frequency from the oscillator 14. The output of the amplifier 32 is transmitted to the receiving station over any desired kind or type of interconnection or communication circuit 36.

At the receiver end of the system suitable apparatus is provided which is driven in accordance with the rotation of a suitable shaft element 12. The shaft 12 is connected to a frequency control device 40 which is or may be similar in all respects to the potentiometer 24 and reactance tube 22 at the transmitting station so that the frequency of an oscillator 41 is controlled in the same manner as the frequency of the oscillator 14. The shaft 12 is driven through a differential mechanism 38, later to be described, from a shaft 39 which is driven by suitable power means (not shown) at a speed which is synchronous with the speed of the shaft 10, but not necessarily cophasally therewith. The output from the oscillator 41 as well as the transmitted frequency from the oscillator 14 are applied to a balanced modulator 42. The modulator is of the type by now well known in the art which suppresses the modulating frequency and the modulated frequency and provides only the side frequency or frequencies. The side frequencies will consist of a sum frequency and a difference frequency. The difference frequency for the frequency values assumed above, solely by way of example, will lie between 0 and 1,000 C. P. S., and this frequency is selected by a low pass filter 44 which may, for the assumed frequencies, have a cut off frequency of 2,000 C. P. S.

In the present instance and solely by way of example, when the shafts 10 and 12 are in the desired relative phase position, there will be no output from the filter 44, since the sum frequency will be substantially completely attenuated by the filter. The difference frequency is applied to the input of a frequency responsive device, for example a pulse counting type of frequency meter, indicated at 45. An example of a device of this type is shown and described in the Proceedings of the I. R. E., 19, 659 (April 1931), "Direct-reading Frequency Meter" by F. Guarnaschelli and F. Vecchiacchi. The output from the frequency meter is connected to a galvanometer 48 so that a direct reading of the difference frequency may be obtained.

If it is desired to hold the two rotating systems in phase, the position of the output shaft 12 may be changed by means of the differential mechanism 38 until the galvanometer 48 reads zero. This same result may be obtained by momentarily slowing down or speeding up the whole receiving rotating system slightly. It is desirable that the frequency meter 45 have several ranges in order that sufficient deflection can be obtained on the galvanometer 48 to be easily observed.

The previously mentioned differential mechanism 38, shown by way of example, includes a pair of bevel gears 51 and 52, meshing with one or more bevel pinions 53. These latter are rotatably carried in the usual manner by a ring gear 56. The ring gear is in mesh with a pinion 58 so that its angular position may be adjusted by a hand wheel 61. It will be understood that customary and suitable bearing supports (not shown) will be provided for the mechanism just described in connection with the differential 38.

In operation of the system shown in Fig. 1, it will be assumed that the shaft 10 is rotating in the direction of the arrow and that the shaft 12 and driving shaft 39 at the receiving station are rotating not only synchronously with the shaft 10 but in a cophasal relationship. That is to say, the angular position of the shaft 10 bears a desired predetermined relationship to the angular position of the shaft 12 at the same instant. In this case, the frequency variations of the oscillator 14 coincide with the frequency variations of the oscillator 41 and the galvanometer 48 indicates zero frequency. Assuming that shaft 12 rotates slightly in advance of the shaft 10, then the reading of the galvanometer will indicate this displacement of desired representative angular position. This may be corrected by rotating the hand wheel 61 until the galvanometer again shows its minimum or zero reading.

It is to be noted that where the shafts 10 and 12 are in synchronism but not exactly in phase, the indicator of the galvanometer will follow the difference frequency, not only when this difference is relatively small, but when it increases abruptly once for each revolution if the shaft speed is comparable to the vibration period of the instrument. For higher shaft speeds, the reading of the galvanometer will be an average of the total frequency difference if the vibration period is low. If an instrument such as an oscillograph having a fast response characteristic is used, it is preferable to feed the instrument through an integrating circuit with a time constant which is only sufficiently large to carry over for the time of one revolution of the shafts.

Fig. 2 of the drawings shows a modification of Fig. 1 in which the shafts to be maintained in phase vary the amplitude of the control waves rather than varying another characteristic thereof, such as the frequency. Like reference characters are used for parts which perform the same functions as in Fig. 1, and therefore, the transmitter and receiver shafts are designated by numerals 10 and 12, respectively. An oscillator 111 is coupled in any suitable manner to an amplifier 112 as by a transformer secondary coil 114. The gain control of this amplifier is shown as a potentiometer 116, the movable contact 118 of which is connected to the shaft 10. By this arrangement, the amplitude of the control wave from the oscillator 111 is varied in amplitude in a sawtooth fashion.

Similar equipment for varying the amplitude of a control wave of an oscillator 120 is indicated by reference character 121. The amplitudes of the two waves which are made to differ by 180° in phase as by a phase inverter tube or an added stage of amplification in the amplifier 112 are compared at the receiving station by a push-pull mixer 123, and the difference in phase of the rotating systems is read on a zero center voltmeter or galvanometer 124. A vacuum tube circuit which will serve as a mixer is shown in greater detail in Fig. 4 of the drawings. The meter 124 will deflect to the right or left, depending on which system is ahead in phase.

The operation of the arrangement of Fig. 2 will be better understood from a description thereof given in connection with the curves of Fig. 3. Referring to Fig. 3, the curve 126 represents the voltage output from the amplifier 112 which may vary in the positive direction as shown in accordance with the operation of the potentiometer 116 in the manner previously explained. The curve 127 represents the voltage output from the oscillator and gain controlled amplifier 121. The curves 126 and 127 are opposite in polarity which may be obtained, as stated above, by employing a phase inverter tube or an added step of amplification in the amplifier 112. For purposes of illustration, it has been assumed in drawing these curves that the shafts 10 and 12 are not precisely in phase but that the wave 126 is leading the wave 127. The resultant voltage wave from the push-pull mixer 126 is represented by the curve 128 which has a constant value $x$ in the positive direction for a greater part of the revolution of these shafts and then changes abruptly to a negative value. With the curve 128, the galvanometer 124 will have a deflection in one direction during the period $x$ and a greater deflection in the other direction for the negative portion of the voltage wave. Where the speed of the shafts is relatively low, for example a few revolutions per minute, the differential mechanism connected to the shaft 12, which may be similar to the differential mechanism 38 of Fig. 1, may be adjusted to bring the meter reading to zero. When the shafts are precisely in step, the galvanometer 124 will not deflect in either direction. The direction in which the galvanometer 124 deflects is an indication of which shaft is leading or lagging the other shaft, as the case may be.

Where the speed of both shafts is quite high, the arrangement shown in Fig. 4 of the drawings may be employed in which the push-pull mixer comprises the tubes 129 and 130. The grid terminal 131 of the tube 129 may be connected to the output of the amplifier 112 and the grid terminal 132 of the tube 130 may be connected to the oscillator and gain controlled amplifier 121. The output of the tubes 129 and 130 is applied to rectifiers 133 and 134 which are connected in opposition to each other. A galvanometer 135 is connected across the D. C. load resistor 136 of the rectifier 133. Another galvanometer 137 is connected across the D. C. load resistor 138 of the rectifier 134. The input to the grid terminals 131 and 132 will be as represented by the curves 126 and 127 and, in effect, the rectifiers 133 and 134 will separate indications from the positive and negative portions of the curve 128.

With the arrangement of Fig. 4, one galvanometer, for example the galvanometer 137, indicates that a given one of the two shafts is occupying a position in advance of the other so that the attendant can determine by observing the galvanometers which shaft is operating in advance of the other and therefore can determine the sense of the adjustment to be made of the differential mechanism to bring the shafts exactly in step and can also estimate the amount of adjustment needed.

Fig. 5 of the drawings discloses a modification of Fig. 2 in which additional equipment is provided automatically to maintain the receiving system in phase with the equipment at a transmitting station. It will be understood that the transmitting station and receiving station equipment may be the same as that shown and described in connection with Fig. 2.

Also, it will be understood that the arrangement shown in Fig. 5 may be excited for operation by other means than that shown in Fig. 2 and that the motor 68 of Fig. 5 may be used for various purposes. In the illustrative embodiment, the motor 68, functions as a servo system to utilize the voltages impressed across the terminals 65 and 66 to operate the differential mechanism, indicated generally by reference character 74. The terminals 65 and 66 may be connected to the conductors designated 67 and 68 on Fig. 2 of the drawings.

The balanced input arrangement of Fig. 5 requires the reversal of the polarity of one of the applied voltages, and to this end, tube 69 serves as a phase inverter. In order to obtain an approximate gain of unity, the resistor 70 may be small.

The differential mechanism 74 is or may be similar to the mechanism 38 of Fig. 1 and comprises a master gear 76 carrying the bevel pinions 77. The master gear 76 meshes with a pinion 78 on the shaft of the motor 68. The shaft 79 may correspond in function to the shaft 39 of Fig. 1. In this illustrative example, an amplitude control device is indicated at 121a and is connected to the differential mechanism by a shaft 12a. As will be pointed out hereinafter, the device 121a may be similar to the device 40 of Fig. 1.

If the input voltage at the terminals 65 and 66 is such that the grid 82 of a tube 83 goes positive and the grid 84 of a tube 86 goes negative, increased plate current in the tube 83 and decreased plate current in the tube 86 will cause a polarized relay 88 to close its contacts 89 and 90.

The relay 88 is shown conventionally and comprises a contact tongue or armature 92 carrying a magnetic element 93 at one end and the previously mentioned contact 90 at an intermediate point, for instance. Operating coils are indicated at 96 and 97 respectively. A self-centering bias for the relay tongue 92 is provided which may be in the form of springs 99.

The motor 68 is a single phase induction motor provided with a tapped primary or field winding 102. The motor winding is connected to opposite terminals of a condenser 104. The tap of the motor winding and the tongue of the relay 92 are connected to terminals 106, adapted for connection to the usual power service or other source of alternating current power for the motor.

When the contacts 89 and 90 are closed, the motor 68 is arranged to run in the proper direction to drive the differential 74 in such fashion as to reduce the phase difference between the shaft 12a and, for example, a shaft 10 as is shown in Fig. 2 or Fig. 1 of the drawings. This will cause the instantaneous voltages going into the push-pull mixer 123 of Fig. 2, for example, to become more nearly equal, and therefore the voltage across the galvanometer will be less.

This whole action will continue until the voltage across the galvanometer 124 is of such a low value that it will not cause enough plate current difference in the tubes 83 and 86 to operate the relay 88 which will then drop back to its neutral position, stopping the motor. An additional opposed stationary contact 108 provides for reversing the motor when the sense of the phase difference is opposite.

Fig. 6 of the drawing indicates the manner in which the apparatus of Fig. 1 is to be changed when it is used in connection with the apparatus of Fig. 5 to obtain automatic adjustment of the phase position of the shaft 12a with respect to the phase position of the shaft 10. This change in equipment is necessary since the automatic arrangement of Fig. 5 is voltage responsive rather than frequency responsive, and therefore, it is necessary to employ discriminators to obtain voltages having a magnitude and polarity or sense which is determined by the relative phase position of the shafts. The frequency varying output from the amplifier 32 of Fig. 1, which appears in the lines 36, is passed through a discriminator 126 and a phase inverter 127. The discriminator 126 may be of any suitable kind or type and may, for example, be of the kind disclosed in a patent to S. W. Seeley, No. 2,121,103, granted June 21, 1938, and referred to above. The varying frequency output from the oscillator 41 of Fig. 1 is passed through a discriminator 199, and the voltages from the discriminator 199 and the phase inverter 127 are put in a push-pull mixer 131 which is or may be similar in all respects to the push-pull mixer 123 of Fig. 2 of the drawings. The output from the mixer 123 which appears in the leads 67a and 68a may be applied to the terminals 65 and 66 of Fig. 5 of the drawing to obtain automatic operation of the equipment of Fig. 1 when it is modified as shown in Fig. 6 of the drawings. Clipping or limiting may be employed ahead of the discriminators 126 and 199 in well known manner so that the voltage at the terminals 67a and 68a will depend only on the frequency difference between the frequency modulated waves from the oscillators 14 and 41.

Various alterations may be made in the present invention without departing from the spirit and scope thereof, and it is desired that any and all such alterations be considered within the purview of the present invention as defined by the hereinafter appended claims.

Having now described the invention, what is claimed and desired to be secured by Letters Patent is the following:

1. Apparatus for maintaining a predetermined cophasal relationship between a plurality of members in continuous motion, comprising means for adjusting the phase position of one of said members relative to a second said member while both members are in motion, a modulated oscillator associated with said one member, the modulations being of saw-tooth shape and indicative of the speed and phase thereof; a second modulated oscillator associated with said second member, the modulations being of similar saw-tooth shape and indicative of the speed and phase thereof; means for combining the modulated oscillations in phase opposition and deriving from their algebraic sum a signal representative of the phase relationship of said moving members with respect to the magnitude and sense of a departure from a predetermined phase relationship, and means operative to employ said signal to control said adjusting means.

2. Apparatus for maintaining a predetermined cophasal relationship between a plurality of members in continuous rotation, comprising means for adjusting the phase position of one of said members relative to a second said member while both members are rotating, means associated with said one member for developing a first saw-tooth wave which varies between minimum and maximum only once during 360 degrees rotation of said one member, means associated with said second member for developing a second saw-tooth wave which varies between minimum and maximum only once during 360 degrees of rotation of said second member, and means operative to employ the algebraic sum of said first and second waves to control said adjusting means.

3. Apparatus for maintaining a predetermined cophasal relationship between two continuously rotating and remotely located shafts, comprising means for adjusting the angular position of one said shaft relative to the other shaft while both are revolving, a saw-tooth wave generator having a controlling part thereof attached to one said shaft and revolving therewith, a saw-tooth wave generator having a controlling part thereof attached to the other said shaft and revolving therewith, means for comparing the outputs of said generators and developing therefrom a signal corresponding to the phase relation of said shafts, and means operative to employ said signal to control said adjusting means.

CARL A. MENELEY.

REFERENCES CITED

The following references are of record in the file of this patent:

UNITED STATES PATENTS

| Number | Name | Date |
|---|---|---|
| 1,299,509 | Rey | Apr. 8, 1919 |
| 1,450,966 | Affel | Apr. 10, 1923 |
| 1,710,223 | Jacobson | Apr. 23, 1929 |
| 1,715,732 | Zworykin | June 4, 1929 |
| 2,025,315 | Stansbury | Dec. 24, 1935 |
| 2,228,079 | Gulliksen | Jan. 7, 1941 |
| 2,280,019 | Alexanderson et al. | Apr. 14, 1942 |
| 2,306,360 | Stuart | Dec. 22, 1942 |
| 2,395,575 | Mitchell | Feb. 26, 1946 |
| 2,454,772 | Chatterjea et al. | Nov. 30, 1948 |